Oct. 23, 1962  L. C. MEADE  3,059,539
MULTI-POSITION REAR VISION MIRROR
Filed Feb. 4, 1959
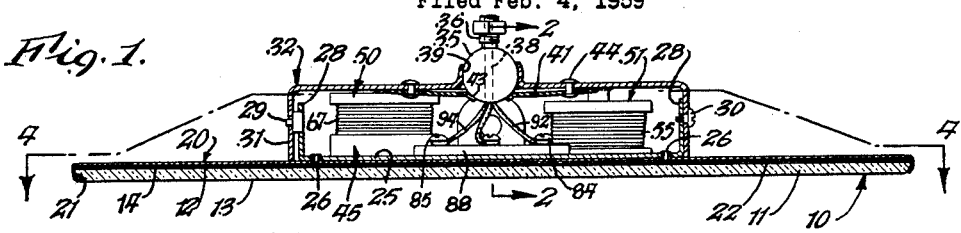
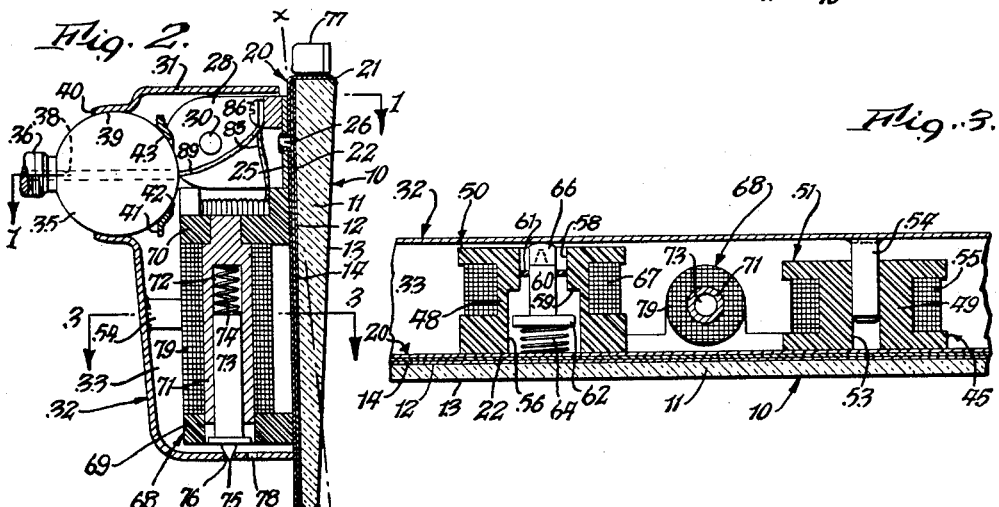
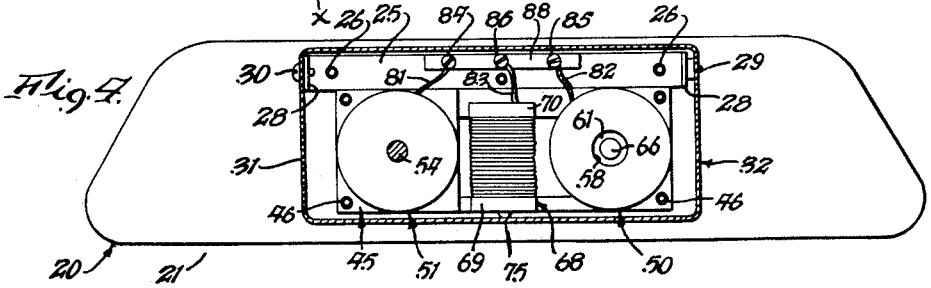
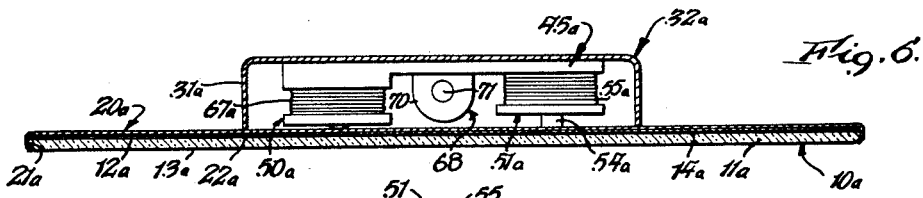
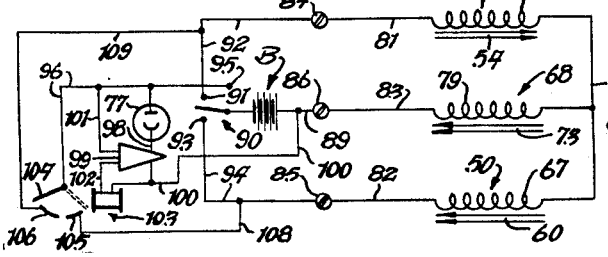
INVENTOR.
Lynn C. Meade
BY
Popp and Sommer
Attorneys

United States Patent Office 3,059,539
Patented Oct. 23, 1962

3,059,539
MULTI-POSITION REAR VISION MIRROR
Lynn C. Meade, Buffalo, N.Y., assignor to Standard Mirror Company, Inc., Buffalo, N.Y.
Filed Feb. 4, 1959, Ser. No. 791,093
2 Claims. (Cl. 88—77)

This invention relates to a multi-position mounting and actuating mechanism for a rear vision mirror and is more particularly shown as a mounting for a glare reducing rear vision mirror adapted for both day and night traveling wherein the brightness of reflected images or light from headlights or the sun can be reduced selectively to the desired intensity. However, the invention can also be embodied in an ordinary rear vision mirror panel where the multi-position adjustment is operative to move the mirror panel from an operative to an inoperative position in avoiding glare.

This application is an improvement on the copending application for multi-position mirror filed by William R. Knowlton and Lynn C. Meade on July 7, 1958, under Serial No. 746,842.

As with this copending application, the invention is particularly shown in conjunction with a mounting for a single prismoidal mirror panel as shown in the La Hodny and Bertell Patent No. 2,325,615 granted August 3, 1943, for Mounting for Rear Vision Mirrors where a high intensity image is reflected from the metallic reflective coating on the back of the transparent prismoidal glass panel and the low intensity image is reflected from the front face of the prismoidal glass panel. It is also possible to employ two glass panels arranged at an angle to each other and one of which is provided with a reflective coating as shown in the Bertell and Meade Patent 2,640,394 granted June 2, 1953, for Rear Vision Mirror. It is also possible to employ the mounting for an ordinary mirror panel in which case in one position the mirror panel is operative and in another position the view along the roadway to the rear is out of the operator's line of sight so that glaring light from headlights of following automobiles can be avoided.

In common with the said copending application one of the principal objects of the present invention is to provide such a multi-position rear vision mirror which is operated electrically and can be controlled from a switch at a remote place so that the rear vision mirror can be adjusted with great ease and so that it can be arranged externally of the automobile body or at any other place and at the same time be readily adjusted.

In common with the said copending application another object is to provide such a mounting which is free from vibration and is also free from loss of proper position due to the vibration and jarring of the automobile in which it is mounted.

In common with the said copending application another object of the invention is to provide such a rear vision mirror which can be readily adjusted about a ball joint to suit the position and height of the driver without interfering with the adjustment of the mirror panel as to its intensity of reflection.

A specific object of the present invention is to provide such an electrically actuated rear vision mirror in which the electrical components are more compact and are compactly arranged so as to permit the actuating mechanism to be contained within a smaller space and thereby render the rear vision mirror less bulky and permitting of more pleasing styling.

Another specific object is to provide such a rear vision mirror mounting in which the solenoids for shifting the mirror panel from one position to another are direct acting, that is, do not require cams or the like. By this arrangement they can be made smaller and more suited to their purpose and also have a smaller power requirement.

Another object is to provide such an electrically actuated rear vision mirror in which an electrically actuated latch is provided for latching the mirror in either or any of its selected positions. By this arrangement direct acting solenoids can be used to position the mirror and the electrically actuated latch can be used to provide a fine adjustment of the mirror panel to exactly the right degree of angularity and also to hold the mirror panel in such accurate adjusted position free from vibration and also free from manual change of the adjusted position of the mirror in aiming the mirror.

Another specific object is to provide such a mounting in which both the solenoids for shifting the mirror and the electrically actuated means for latching the mirror are operated in proper sequence so that by the manipulation of a simple reversing switch, which can be either a foot switch or a hand switch, the mirror can be adjusted, as to intensity, from one position to the other.

Another specific object is to provide such a rear vision mirror having the above advantages and which at the same time is extremely simple and rugged in construction and also low in cost.

Other objects and advantages of the invention will be apparent from the following description and drawings in which:

FIG. 1 is a horizontal sectional view taken generally on line 1—1, FIG. 2.

FIG. 2 is a vertical sectional view taken generally on line 2—2, FIG. 1 and showing the position of the parts for reflecting a high intensity image, such position being used for normal daytime travelling where the maximum reflectivity is ordinarily desirable. The position of the mirror for reflecting an image of reduced intensity is shown by the dot-dash line x—x.

FIG. 3 is a fragmentary horizontal section taken generally on line 3—3, FIG. 2.

FIG. 4 is a vertical sectional view taken generally on line 4—4, FIG. 1.

FIG. 5 is a wiring diagram of the electrical circuit.

FIG. 6 is a view similar to FIG. 1 illustrating a modified form of the invention.

Referring particularly to the form of the invention shown in FIGS. 1 through 5, the invention is shown as embodied in a mounting for a prismoidal glass mirror panel which is indicated generally at 10, although it will be understood that the mounting can also be used to support an ordinary flat glass mirror panel in which case the multi-position adjustable support as hereinafter described is merely used to move the mirror panel from an operative to an inoperative position and vice versa. The prismoidal mirror panel 10 is shown as made of a horizontally elongated transparent plate of glass 11 which is ground so that the vertical axis of its rear planar face 12 is set at an angle to the vertical axis of its front planar face 13 but the horizontal axes of these faces are parallel, and the mirror panel 10 is thereby wedge-shaped in vertical section and is arranged with its thicker part at its upper end, although this is optional. The glass plate 11 is provided on its rear face with a coating 14 of reflective material, this coating being preferably of a highly reflective metal such as silver in view of the fact that dulled reflection is obtained through using the secondary image reflected by the front face 13 of the glass panel 11. This glass panel 11 is shown as having a straight bottom, rounded, upwardly converging end edges, and a straight top to provide a mirror of pleasing shape.

The mirror panel 10 is provided with a metal plate 20, the edges 21 of which conform to the edges of the mirror panel 10 and these edges 21 being flanged or bent around the rim of the mirror panel 10 to provide a bezel. The silvered mirror panel 10 is also preferably backed by a paper protecting sheet 22.

A horizontal metal strip 25 is secured to the face of the metal backing plate 20 opposite the mirror panel 10 near the top edge thereof. This metal strip can be secured in any suitable manner as by the integral grommets or tubular rivets 26 shown, and is formed at its opposite ends to provide a pair of ears 28 which project outwardly and are provided with alining openings for a hinge pin 29 through one ear and for a hinge pin 30 in the form of a screw through the other ears. The hinge pin 29 is mounted on one side of the rim 31 of a shell or case 32 which is cup-shaped and shown as being of generally rectangular form with its concavity facing the backing plate 20 and with the side walls of its rim 31 embracing the ears 28 in closely spaced relation thereto. The pivot screw 30 can be of any suitable form to anchor in its ear 28 and to provide a pivotal mounting for this ear on the rim 31 of the shell or case 32. It will therefore be seen that the case or shell 32 forms, with the backing plate 20, a chamber 33. The electrical components, with the exception of remotely located switch are entirely contained within this chamber and the components are therefore concealed from view as well as protected.

The numeral 35 represents a ball having a threaded stem 36 which can be secured in any suitable means (not shown) to the body of an automobile. This ball is shown as provided with an axial through bore 38 forming a conduit for electrical control wires as hereinafter described. This ball seats against a conical seat 39 provided in the vertical wall of the case or shell 32 surrounding an opening 40 through which the stem 36 projects. The larger part of the ball 35 is arranged inside the chamber 33 of the case or shell 32 and the conical seat 39 thereby faces the mirror panel 10.

The stem side of the ball 35 is held in frictional engagement with the seat 39 by a spring plate 41. This spring plate is shown as being of horizontally elongated form and as having a central opening 42 the rim of which is offset toward the mirror panel 10 so as to provide a spherical seat 43 for the face of the ball 35 which faces the mirror panel 10. The horizontal ends of the spring plate 41 are secured to the case or shell 32 by rivets 44 or in any other suitable manner.

The mechanism for adjusting the mirror panel 10 to its two positions of intensity of reflection comprise electrical components within the chamber 33 and largely mounted on a rectangular plate 45 of dielectric material, preferably of molded plastic so that certain parts of the electrical components can be molded directly as an integral part of this mounting plate. The dielectric mounting plate 45 is secured to the face of the backing plate 20 for the mirror panel in any suitable manner as by integral grommets or tubular rivets 46 as shown.

The vertical dielectric plate 45 is arranged at the center of the rear vision mirror assembly and on opposite sides, horizontally, of its center is formed to provide a pair of rearwardly projecting stems 48 and 49, each having an enlarged circular head at its outer end and forming the base of a solenoid indicated at 50 and 51, respectively.

The dielectric stem 49 of the solenoid 51 has a cylindrical bore 53 in which a movable core 54 slides axially in a horizontal fore-and-aft direction. This core is secured in any suitable manner to the vertical wall of the case or shell 32. The solenoid 51 is provided with a winding 55 and it will be seen that when this winding is energized, the dielectric stem 49 and winding 55 of this solenoid will be displaced toward the vertical wall of the case or shell 32, thereby to swing the mirror panel 10 clockwise about the axis of its pivot pins 29, 30 toward the full line position shown in FIG. 2.

The dielectric stem 48 of the solenoid 50 is provided with a bore having an enlarged end 56 toward the mirror panel 10 with its opposite end 58 reduced to provide an annular stop shoulder 59 which faces the mirror panel 10.

The movable core 60 of this solenoid is slidingly mounted in the reduced end 58 of the bore, preferably in a small guide ring 61. Within the bore, the movable core 60 is provided with an enlarged radial outwardly extending end flange 62 which is engageable with a stop shoulder 59, the movable core 60 is urged toward this stop shoulder 59 by a helical compression spring 64 which is interposed between the core 60 and the backing plate 20 for the mirror panel 10. The tapered end of the core 60 is preferably rounded and engages the vertical wall of the case or shell 32 and this end 66 is preferably of brass to avoid adhering magnetically to the case or shell 32.

Solenoid 50 is provided with a winding 67 and it will be seen that when this winding is energized, its core 60 is projected away from the mirror panel 10 so as to swing the mirror panel 10 counter-clockwise about the axis of its pivot pins 29, 30 as viewed in FIG. 2, to the angular position indicated by the dot-dash line x—x in this figure.

An important feature of the invention resides in an electromagnetic latch which positively latches the mirror panel 10 in either of its two adjusted positions after the solenoids 50, 51 have been deenergized and which also serves to position the mirror panel exactly at the angular positions required for a properly aimed, bright and also a properly aimed, dim image. This electromagnetic latch is indicated generally at 68 and is shown as constructed as follows:

The numeral 69 represents a lower lug formed integrally with the dielectric plate 45 and the numeral 70 represents an upper lug also formed integrally with this dielectric plate and arranged directly above the lug 69. These lugs carry a vertical brass sleeve 71, which is fixed therein and which has a blind bore 72 open at the lower end of the sleeve. In this bore is slidingly arranged a movable core 73, which is yieldingly urged downwardly by a helical compression spring 74. The lower end of the core is provided with a coaxial downwardly directed conical point 75 which is preferably of brass and forms a latch. This brass point or latch is received in one of two holes or shoulders 76, 78 provided in the bottom of the flange 31 of the shell or case 32. When the point 75 is fitted in the hole or shoulder 76, the mirror panel is in the full line position shown in FIG. 2 in which an image of maximum intensity is reflected by the mirror panel 10. When the point 75 is in the hole or shoulder 78, the mirror panel 10 is in the angular position indicated by the dot-dash line x—x, FIG. 2, in which position an image of reduced intensity is reflected from the surface 13 of the glass into the eyes of the driver. The solenoid 68 is provided with a winding 79.

As an accessory, a photoelectric cell 77 can be mounted on the rim of the mirror panel assembly, such as the top of the bezel 21 of the metal plate 20, in any suitable manner (not shown), so as to be sensitive to light from the rear of the car. As hereinafter described, when this photocell is placed in operation, excessive light from the rear, as from the glaring headlights of a following car, will automatically shift the mirror to its "dim" or low intensity reflection position.

Referring to the wiring diagram, FIG. 5, each winding 55—67 and 79 are connected by a common line 80. The other ends of these windings are connected, respectively, by lines 81, 82 and 83 to binding posts 84, 85, 86 which are mounted on a dielectric strip 88 suitably secured to the horizontal metal strip 25 within the chamber 33. The binding post 86 is connected by a line 89 with one side of the battery B, the other side of this battery being connected with the movable contact of a reversing switch 90. This movable contact is movable either into engagement with a fixed contact 91 connected by a line 92 with the binding post 84, or with a fixed contact 93 connected by a line 94 with the binding post 85.

The lines 89, 92 and 94 preferably leave the chamber 33 through the bore 38 in the ball and stem 35, 36 and the reversing switch 90 is preferably a foot switch arranged within convenient reach of the driver although it will be understood that this switch can be manually operated and located at any suitable place and that it can take a number of different forms, preferably always being biased to a neutral position in which it is open.

As previously indicated, a photoelectric cell 77 can be incorporated in the circuit so as to automatically shift the mirror panel 10 to its position of low intensity reflection when the glare from headlights of a following car provides excessive light on the photocell. This photocell can be mounted anywhere to be sensitive to such glare but is shown as mounted on top of the bezel 21 and to place it in operation a third fixed contact 95 is provided in the manual reversing switch 90. This contact is shown as connected by a line 96 with the cathode of the photocell 77, the anode of which is connected by a line 98 with an amplifier 99, the other side of which is connected by a line 100 with the positive side of battery B. The line 96, through lines 101 and 102, the output of this amplifier 99 with the winding of a normally open relay 103, the other side of this winding being connected to the battery line 100. The line 96 also connects with the armature 104 of this relay which, when the relay is deenergized, is in the full line position shown in FIG. 5 and out of contact with the fixed contacts 105 or 106 which it sweeps over when the relay is energized. The contacts are shown as being of extended length along the path of the armature so that as the armature travels over there is sufficient time for changing the reflectivity of the mirror. The movement of the armature can also be retarded, of course.

When the relay 103 is energized it successively engages and sweeps across the contacts 106 and 105 and passes beyond the contact 105 to the dotted line open position shown in FIG. 5. When the relay is deenergized, it successively reengages contacts 105 and 106 ending in the full line open position shown in FIG. 5. The contact 105 is connected by a line 108 with the line 94 and the contact 106 is connected by a line 109 with the line 92.

In the manual operation of the form of the invention shown in FIGS. 1–5, and assuming the parts to be in the position illustrated by full lines in which an image of maximum brightness is provided, when the driver desires to reduce the intensity of the image reflected, he moves the movable contact of the reversing switch 90 into engagement with the fixed contact 93. This engagement can be only momentary since the shifting and latching of the mirror is accomplished very rapidly. This establishes a circuit from the battery B through fixed contact 93 of reversing switch 90, lines 94 and 82, winding 67 of solenoid 50, common line 80, winding 79 of solenoid 68 and lines 83 and 89 to the other side of the battery.

Accordingly, the solenoids 68 and 50 are energized. The energization of the solenoid 68 pulls up its core 73 against the resistance of the helical compression spring 74 thereby to withdraw its brass point or detent 75 from the hole 76. The energization of the solenoid 50 serves to draw its movable core 60 away from the mirror panel 10 and to cause its brass tip 66 to press against the inside of the case or shell 32. Since the winding 67 is fast to the mirror panel 10, this energization of the solenoid 50 tends to spread apart, for-and-aft the lower ends of the case or shell 32 and the mirror panel 10. Since the brass point or detent 75 of the solenoid 68 has been released from the hole 76, this spreading force of the solenoid 50 moves the mirror panel 10 to the angular position shown by the line x—x, FIG. 2, where an image of reduced intensity is reflected into the eyes of the driver.

To restore the mirror panel 10 to its position of maximum intensity of reflection shown by full lines, the driver moves the reversing switch 90 to close the circuit through the fixed contact 91. Again this engagement can be only momentary since the shifting and latching of the mirror is accomplished very rapidly. This establishes a circuit from the battery B from fixed contact 91 of reversing switch 90 lines 92 and 81 winding 55 of solenoid 51, common line 80, winding 79 of solenoid 68 and lines 83 and 89 to the other side of the battery.

Accordingly the solenoids 68 and 51 are energized. The energization of the solenoid 68 pulls up its core 73 against the resistance of the helical compression spring 74 thereby to withdraw its brass point or detent 75 from the hole or shoulder 78. The energization of the solenoid 51 serves to draw its movable core 54 toward the mirror panel 10. Since the winding 55 is fast to the mirror panel 10, this energization of the solenoid 51 tends to pull together, for-and-aft, the lower ends of the shell or case 32 and the mirror panel 10. Since the brass point or detent 75 of the solenoid 68 has been released from the hole 78, this drawing force of the solenoid 51 moves the mirror panel 10 to the angular position in which an image of maximum intensity is reflected into the eyes of the driver, this being illustrated by full lines in FIGS. 1–4.

For automatic dimming, the driver shifts the switch 90 to establish a circuit through the contact 95. When the light from the rear exceeds a comfortable level, assuming the mirror panel 10 to be in its position of high intensity reflection, this light energizes the photoelectric cell 77 so that a circuit is established from the negative side of the battery B through closed contact 95, line 96, photocell 77 and amplifier 99 through line 100 to the positive side of the battery B.

The output from this amplifier passes through line 102 and the winding of the normally open relay 103, the armature 104 of which pulls up from the full line position shown in FIG. 5 across the contacts 106 and 105 to the open dotted line position. Since the mirror is in its position of high intensity reflection no change in the position of the mirror panel 10 occurs when the armature 104 travels over the contact 106. However during the period of contact with the contact 105 the armature 104 supplies battery current from the line 96 through contact 105 and line 108 to line 94, thereby to shift the mirror panel 10 to its position of low intensity reflection as previously described. The armature 104 is then drawn to its open position shown by dotted lines, FIG. 5, thereby to permit the mirror panel to be latched in its position of low reflectivity as previously described.

When the light to the photocell 77 drops to a tolerable level, the photocell deenergizes the amplifier 99 and relay 103 so that the armature 104 of the latter successively reengages the contacts 105 and 106 coming to rest in the open full time position shown in FIG. 5. Passing over the contact 105 has no effect on the mirror panel 10 because it is already in its position of low reflectivity. However, in passing over the contact 106 it supplies current to the line 92 thereby to shift the mirror panel to its position of high intensity reflection. Coming to rest in its open full line position permits the mirror to latch in the new position as previously described.

It is apparent that instead of mounting the dielectric panel 45 on the backing plate 20 for the glass mirror panel 11 and mounting the movable core 54 on the metal shell or case 32 this relationship can be reversed, this modification of the invention as illustrated in FIG. 6 in which the dielectric panel 45a is shown as mounted on the metal shell or case 32a with the movable core 54a mounted on the metal backing plate 20a of the mirror panel 10a. Since in other respects the form of the invention shown in FIG. 6 is identical in construction and operation to the form of the invention shown in FIGS. 1–5 similar reference numerals have been applied and distinguished by the suffix "a" and the description is not repeated. Also as with the form of the invention shown in FIGS. 1–4 the entire back of the rear vision mirror can be enclosed or shrouded by a rounding back 110a having a rim in the form of a bezel 111a around the rim of the mirror panel 10a.

From the foregoing it will be seen that the present invention provides a very simple, rugged, compact and reliable remote controlled electrically actuated multi-position rear vision mirror in which the electrical components are not only direct acting but are also arranged so as to positively latch the mirror panel in which its adjusted positions to insure both freedom from vibration and also accuracy of adjustment.

I claim:

1. A multi-position rear vision mirror, comprising a reflective panel member, a support member, means pivotally supporting said panel member on said support member to swing about an axis generally parallel with a reflective surface of said panel member, a pair of solenoid coils interposed between said members to one side of said axis each with its axis generally perpendicular to said reflective surface, an axially movable core arranged coaxially of each coil, means connecting said coils and cores to said members whereby energization of one coil draws said members together and energization of the other coil spreads said members apart, a flange on one of said members projecting toward the other member, a pair of detent shoulders on said flange spaced to correspond to two positions of adjustment of said panel member about said fixed axis, a solenoid latch coil on the member opposite said flange, and arranged to move into axial alinement with said shoulders in response to said swinging of said panel member between said two positions of adjustment, an axially movable core in said solenoid latch coil, a latch fixed directly on one end of said core and having latching engagement with each of said shoulders and moved away from said flange by said core in response to energization of said solenoid latch coil and switch means for selectively establishing a circuit including said solenoid latch coil alternately through said first named coils.

2. A multi-position rear vision mirror as set forth in claim 1 wherein said detent shoulders are in the form of holes in said flange and wherein said latch is in the form of a point at the end of said core adapted to enter and wedge into each of said holes.

References Cited in the file of this patent

UNITED STATES PATENTS

| | | |
|---|---|---|
| 1,887,706 | Bettman | Nov. 15, 1932 |
| 2,504,387 | Pruellage | Apr. 18, 1950 |
| 2,718,175 | Gim | Sept. 20, 1955 |
| 2,806,408 | Moeller | Sept. 17, 1957 |

FOREIGN PATENTS

| | | |
|---|---|---|
| 323,811 | Switzerland | Sept. 30, 1957 |